United States Patent
Erdmenger et al.

(10) Patent No.: US 10,428,673 B2
(45) Date of Patent: Oct. 1, 2019

(54) ASPIRATING FACE SEAL ASSEMBLY AND A METHOD OF OPERATING THE SAME

(71) Applicant: General Electric Company, Schenectady, NY (US)

(72) Inventors: Rodrigo Rodriguez Erdmenger, Munich (DE); Nathan Evan McCurdy Gibson, West Chester, OH (US); Quang Tue Nguyen Tran, Munich (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 683 days.

(21) Appl. No.: 15/143,878

(22) Filed: May 2, 2016

(65) Prior Publication Data

US 2017/0314409 A1     Nov. 2, 2017

(51) Int. Cl.
| | |
|---|---|
| *F01D 11/02* | (2006.01) |
| *F16J 15/34* | (2006.01) |
| *F16J 15/44* | (2006.01) |
| *F01D 11/04* | (2006.01) |

(52) U.S. Cl.
CPC .......... *F01D 11/025* (2013.01); *F01D 11/04* (2013.01); *F16J 15/3404* (2013.01); *F16J 15/445* (2013.01); *F05D 2220/32* (2013.01); *F05D 2240/24* (2013.01); *F05D 2240/55* (2013.01)

(58) Field of Classification Search
CPC ....... F16J 15/342; F01D 11/025; F01D 11/02; F01D 11/04; F01D 11/06
See application file for complete search history.

(56) References Cited

U.S. PATENT DOCUMENTS

| | | |
|---|---|---|
| 3,383,033 A | 5/1968 | Moore |
| 4,596,116 A | 6/1986 | Mandet et al. |
| 4,746,268 A | 5/1988 | Sugimoto et al. |
| 5,375,852 A | 12/1994 | Charhut |

(Continued)

OTHER PUBLICATIONS

Bagepalli Bharat, "Aspirating Seal Development: Analytical Modeling and Seal Test Rig", Aircraft Propulsion and Power, NASA, 25 Pages, Mar. 1, 1996.

*Primary Examiner* — Justin D Seabe
(74) *Attorney, Agent, or Firm* — Christopher R. Carroll; The Small Patent Law Group LLC (57) ABSTRACT

An aspirating face seal assembly for a turbo-machine including a rotor assembly having a first radially extending portion defining a rotor surface is disclosed. The aspirating face seal assembly includes a seal body including a second radially extending portion defining a bearing surface and having a plurality of return channels. The second radially extending portion is disposed in the turbo-machine such that the bearing surface is disposed facing the rotor surface. The aspirating face seal assembly further includes an annular ring including one or more openings. The annular ring is concentrically disposed on the second radially extending portion and between the rotor surface and the second radially extending portion and configured to rotate in an event of rub between the first radially extending portion and the annular ring. A turbo-machine including the aspirating face seal assembly and a method for operating an aspirating face seal are also disclosed.

20 Claims, 8 Drawing Sheets

(56) References Cited

U.S. PATENT DOCUMENTS

| | | | |
|---|---|---|---|
| 5,975,537 A * | 11/1999 | Turnquist | F16J 15/443 |
| | | | 277/411 |
| 6,676,369 B2 | 1/2004 | Brauer et al. | |
| 6,758,477 B2 | 7/2004 | Brauer et al. | |
| 6,786,487 B2 | 9/2004 | Dinc et al. | |
| 7,044,470 B2 | 5/2006 | Zheng | |
| 8,066,473 B1 * | 11/2011 | Aho, Jr. | F01D 11/025 |
| | | | 415/112 |
| 8,109,716 B2 * | 2/2012 | Glahn | F01D 11/025 |
| | | | 415/168.2 |
| 8,206,083 B2 * | 6/2012 | Garrison | F16J 15/342 |
| | | | 277/400 |
| 8,262,349 B2 | 9/2012 | Turnquist et al. | |
| 9,109,459 B2 | 8/2015 | Sha et al. | |
| 9,115,810 B2 | 8/2015 | Bidkar et al. | |
| 2003/0184022 A1 | 10/2003 | Brauer et al. | |
| 2003/0185669 A1 | 10/2003 | Brauer et al. | |
| 2005/0047912 A1 | 3/2005 | Giesler et al. | |
| 2010/0194224 A1 | 8/2010 | Smithanik et al. | |
| 2012/0177316 A1 | 7/2012 | Liang et al. | |
| 2012/0293033 A1 | 11/2012 | Hisada | |
| 2014/0064909 A1 | 3/2014 | Trivedi et al. | |
| 2015/0184529 A1 | 7/2015 | Zheng et al. | |

* cited by examiner

ASPIRATING FACE SEAL ASSEMBLY AND A METHOD OF OPERATING THE SAME

BACKGROUND

Embodiments of the present invention relate generally to a turbo-machine and more particularly relates to an aspirating face seal used in the turbo-machine.

Typically, face seals are used to minimize leakage of a pressurized fluid through a gap between two components from a region of higher pressure to a region of lower pressure in a turbo-machine. Such seals have been used in rotating machines, for example, a steam turbine, a gas turbine, or the like. In applications such as gas turbine engines, aspirating face seals are used to minimize leakage of a fluid such as compressed air or combustion gases between a rotor and a stator. The face seals disposed in the gaps or leakage paths between the stator and the rotor are configured to compensate for variations in the gaps due to differential thermal and mechanical component expansions during the machine operating cycle.

Conventional aspirating face seals typically have mutually facing rotatable and non-rotatable seal elements. The rotatable seal elements are coupled to or form a monolithic portion of the rotor. The non-rotatable seal elements are coupled to a portion of the stator and movable axially. The rotatable and non-rotatable seal elements are generally annular, and perpendicular to a longitudinal axis of the rotor.

During operation, the aspirating face seals typically operate with a tight clearance between the non-rotating seal elements and rotating seal elements. Under normal operating conditions, no contact is expected to occur between the non-rotating seal elements and rotating seal elements. However, under extreme circumstances, contact between the non-rotating seal elements and rotating seal elements may occur.

Therefore, it is desirable to have an aspirating face seal assembly that retracts a seal in the event of such a rub between non-rotating seal elements and rotating seal elements.

BRIEF DESCRIPTION

In accordance with an embodiment of the invention, an aspirating face seal assembly for a turbo-machine is disclosed. The turbo-machine includes a rotor assembly having a first radially extending portion defining a rotor surface. The aspirating face seal assembly includes a seal body including a second radially extending portion defining a bearing surface and having a plurality of return channels. The second radially extending portion is configured to be disposed in the turbo-machine such that the bearing surface is disposed facing the rotor surface. The aspirating face seal assembly further includes an annular ring including one or more openings and concentrically disposed on the second radially extending portion. The annular ring is disposed between the rotor surface and the second radially extending portion and configured to rotate in an event of rub between the first radially extending portion and the annular ring.

In accordance with an embodiment of the invention, a turbo-machine is disclosed. The turbo-machine includes a stationary support. The turbo-machine further includes a rotor assembly disposed within the stationary support. The rotor assembly includes a first radially extending portion defining a rotor surface. Furthermore, the turbo-machine includes an aspirating face seal assembly coupled to the stationary support and disposed between the stationary support and the rotor assembly. The aspirating face seal assembly includes a seal body including a second radially extending portion defining a bearing surface and having a plurality of return channels. The bearing surface is disposed facing the rotor surface. The aspirating face seal assembly further includes an annular ring including one or more openings and concentrically disposed on the second radially extending portion. The annular ring is disposed between the rotor surface and the second radially extending portion and configured to rotate in an event of rub between the first radially extending portion and the annular ring.

In accordance with an embodiment of the invention, a method for operating an aspirating face seal assembly of a turbo-machine is disclosed. The method includes feeding a pressurized fluid from a region of higher pressure towards a rotor surface via a plurality of feed holes. The rotor surface is defined by a first radially extending portion of a rotor assembly. The method further includes enabling a return flow of the pressurized fluid towards a second region of low pressure via one or more openings formed in an annular ring and a plurality of return channels formed in a second radially extending portion of the aspirating face seal assembly. The second radially extending portion defines a bearing surface disposed facing the rotor surface. The annular ring is concentrically disposed on the second radially extending portion and between the rotor surface and the second radially extending portion. Furthermore, the method includes rotating the annular ring in an event of rub between the annular ring and the first radially extending portion to partially block an entrance of one or more of the plurality of return channels thereby increasing a force of the flow of the pressurized fluid to bias the second radially extending portion away from the rotor surface.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The specification may be best understood with reference to the detailed figures and description set forth herein. Various embodiments are described hereinafter with reference to the figures. However, those skilled in the art will readily appreciate that the detailed description given herein with respect to these figures is for explanatory purposes as the method and the system may extend beyond the described embodiments.

In the following specification, the singular forms "a", "an" and "the" may include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

Further, as used herein, the terms "axial" and "axially" refer to directions and orientations those extend substantially parallel to a centerline of a turbo-machine. Furthermore, the terms "radial" and "radially" refer to directions and orientations those extend substantially perpendicular to the centerline of the turbo-machine. Moreover, as used herein, the terms "concentrically" and "concentric" refer to arrangement of two or more elements such that their respective centers are aligned. It is to be noted that the term "fluid" as used herein includes any medium or material that flows, including, but not limited to, air, gas, liquid, and steam.

In accordance with some embodiments of the present invention, an aspirating face seal assembly for a turbo-machine is disclosed. The turbo-machine includes a rotor assembly having a first radially extending portion defining a rotor surface. The aspirating face seal assembly includes a seal body including a second radially extending portion defining a bearing surface and having a plurality of return channels. The second radially extending portion is disposed in the turbo-machine such that the bearing surface is disposed facing the rotor surface. The aspirating face seal assembly further includes an annular ring including one or more openings. The annular ring is concentrically disposed on the second radially extending portion and between the rotor surface and the second radially extending portion. The annular ring is configured to rotate in an event of rub between the first radially extending portion and the annular ring. A method for operating an aspirating face seal assembly of the turbo-machine is also disclosed.

Figure 1:
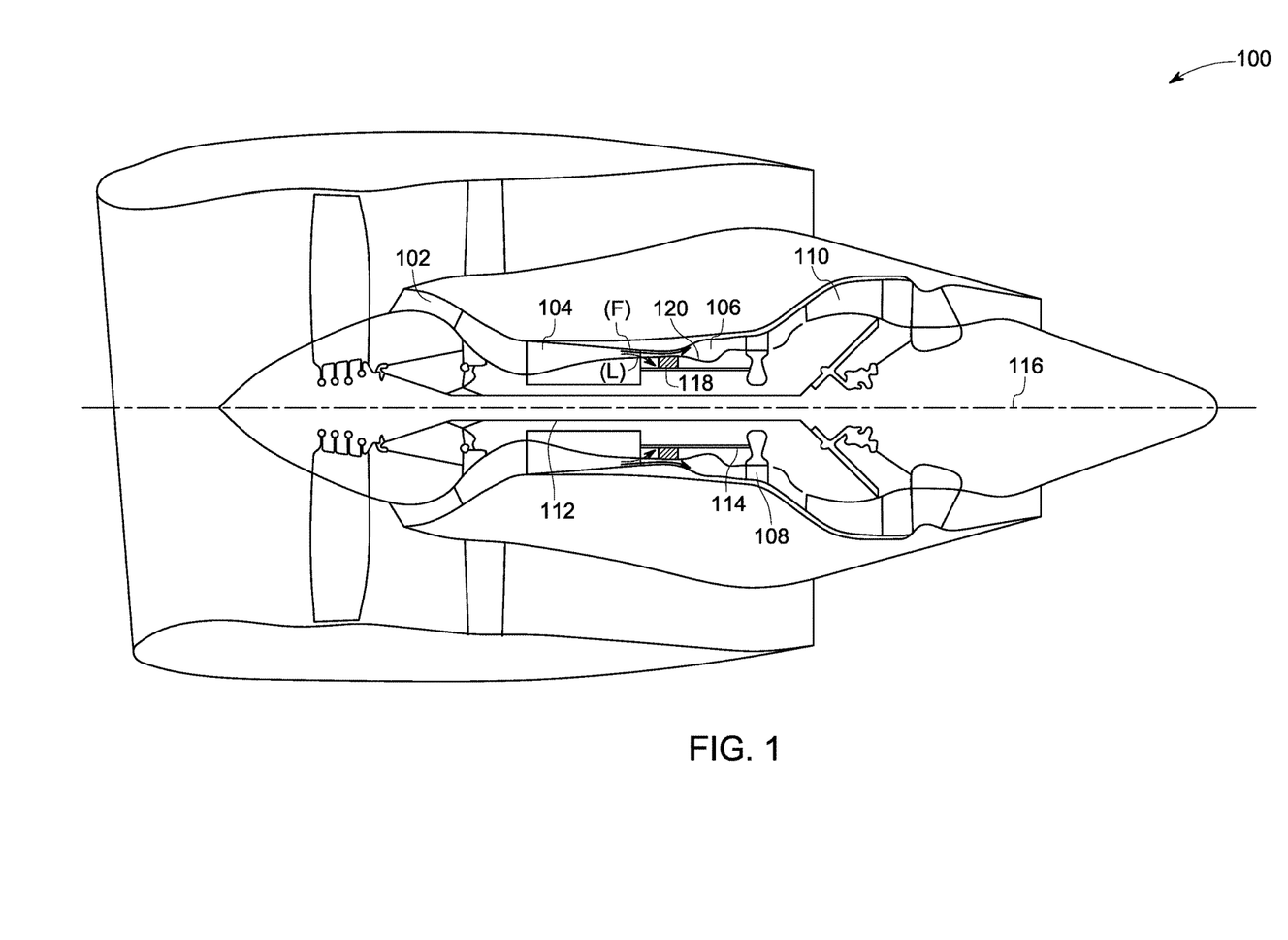
FIG. 1 is a schematic diagram of a turbo-machine in accordance with an embodiment of the present invention.

FIG. 1 is a schematic diagram of a turbo-machine 100 in accordance with an embodiment of the present invention. The turbo-machine 100 may include a low-pressure compressor 102, a high-pressure compressor 104, a combustor assembly 106, a high-pressure turbine 108, and a low-pressure turbine 110 arranged in a serial, axial flow relationship. The low-pressure compressor 102 is coupled to the low-pressure turbine 110 via a first shaft 112. The high-pressure compressor 104 is coupled to the high-pressure turbine 108 via a second shaft 114. The reference numeral 116 represents a centerline of the turbo-machine 100.

The turbo-machine 100 further includes an aspirating face seal assembly 118. In a non-limiting embodiment, the aspirating face seal assembly 118, as depicted in FIG. 1, may be disposed between the high-pressure compressor 104 and the combustor assembly 106. More particularly, in some embodiments, the aspirating face seal assembly 118 may be disposed between the second shaft 114 and a diffuser lining 120 to prevent a leakage flow (L) of a compressed fluid therethrough. Without limiting the scope of the present invention, the aspirating face seal assembly 118, alternatively or additionally, may be disposed at various other places in the turbo-machine 100 where prevention or minimization of the fluid leakage is desired.

During operation, a fluid (e.g., air) flows through the low-pressure compressor 102. The low-pressure compressor 102 compresses the incoming fluid and directs the compressed fluid to the high-pressure compressor 104. The high-pressure compressor 104 further compresses the fluid from the low-pressure compressor 102 and discharges the compressed fluid to the combustor assembly 106. The compressed fluid is mixed with one or more fuels in the combustor assembly 106. Subsequently, the mixture of the compressed fluid and the one or more fuels is combusted within the combustor assembly 106 to form a combustion gas. The combustion gas is discharged from the combustor assembly 106 to the turbines 108, 110. The combustion gas is expanded in the high-pressure turbine 108 and the low-pressure turbine 110.

A flow path for the flow of the compressed fluid from the low-pressure compressor 102 to the combustor assembly 106 may be referred to as a primary flow-path (F). In the non-limiting configuration of FIG. 1, the aspirating face seal assembly 118 is configured to minimize a leakage flow (L) of the compressed fluid in a flow path between the diffuser lining 120 and the second shaft 114. Further details of the aspirating face seal assembly 118 is described in conjunction with FIGS. 2-8.

Figure 2:
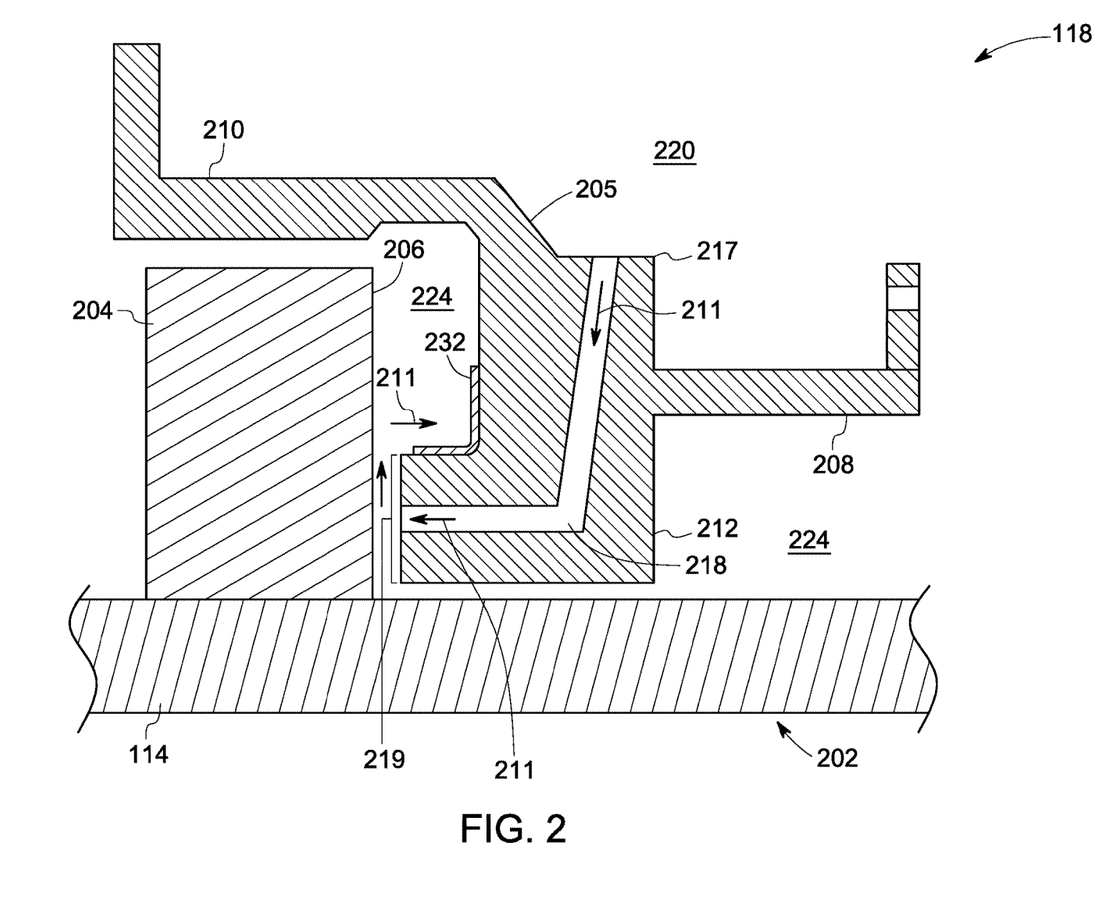
FIG. 2 is a cross-sectional view of an aspirating face seal assembly along with a rotor assembly in accordance with an embodiment of the present invention.

FIG. 2 is a cross-sectional view of the aspirating face seal assembly 118 shown along with a rotor assembly 202 in accordance with an embodiment of the present invention.

The rotor assembly 202 includes a first radially extending portion 204 and the second shaft 114. The first radially extending portion 204 may be mounted on or may be an integral part of the second shaft 114 and configured to rotate with the second shaft 114. The first radially extending portion 204 defines a rotor surface 206.

The aspirating face seal assembly 118 includes a seal body 205. The aspirating face seal assembly 118 may be coupled to the stationary support (e.g., the diffuser lining 120 shown in FIG. 1). In some embodiments, the aspirating face seal assembly 118 may be coupled to the stationary support such that the aspirating face seal assembly 118 is movable along an axial direction and restricted along a radial direction and a tangential direction (e.g., a direction perpendicular to both the axial direction and the radial direction). More particularly, the seal body 205 of the aspirating face seal assembly 118 may be movably coupled to the stationary support via one or more mechanical elements and one or more spring elements (not shown). The seal body 205 is disposed between the stationary support and the rotor assembly 202. The seal body 205 has an annular configuration. In some embodiments, the seal body 205 may be a monolithic annular structure. In some other embodiments, the seal body 205 may include a plurality of segments coupled together to form the annular configuration. The seal body 205 includes a first axially extending portion 208, a second axially extending portion 210, and a second radially extending portion 212 formed together as a monolithic structure or as a segmented configuration. The second radially extending portion 212 defines a bearing surface 219. The seal body 205 is disposed in the turbo-machine 100 (shown in FIG. 1) such that the bearing surface 219 is disposed facing the rotor surface 206.

The second radially extending portion 212 includes a plurality feed holes 218. The plurality of feed holes 218 is configured to enable a feed flow of a pressurized fluid 211 from a first region of high pressure 220 toward the rotor surface 206. More particularly, one end of a feed hole 218 is disposed at an end 217 of the second radially extending portion 212 to receive the compressed/high pressure fluid and other end of the feed hole 218 is disposed at the bearing surface 219 of the second radially extending portion 212 to direct the feed flow of the pressurized fluid 211 towards the rotor surface 206.

Figure 3:
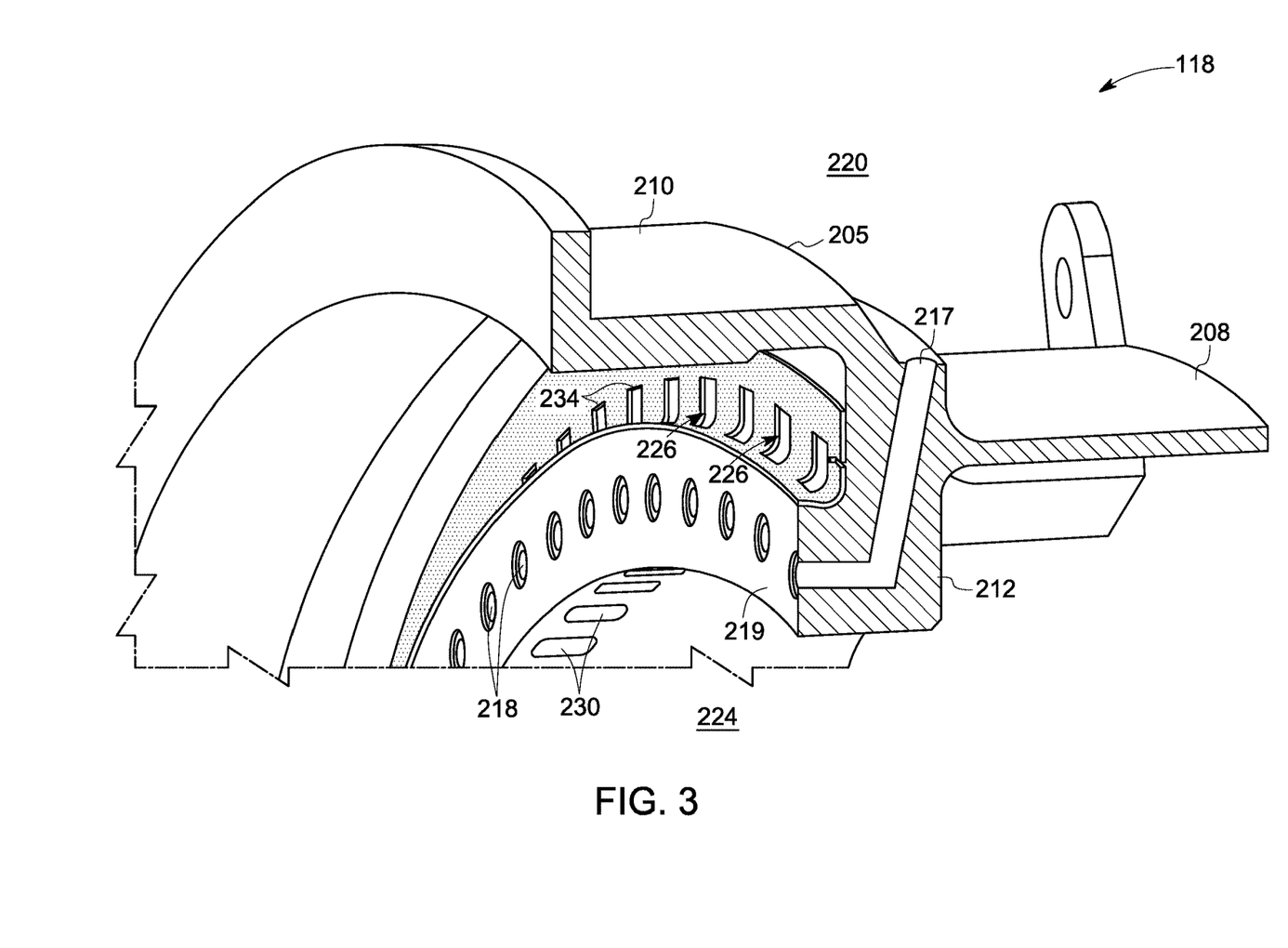
FIG. 3 is a perspective view of a portion of an aspirating face seal assembly in accordance with an embodiment of the present invention.

FIG. 3 is a perspective view of a portion of the aspirating face seal assembly 118 in accordance with an embodiment of the present invention. The plurality of feed holes 218 is disposed circumferentially on the second radially extending portion 212.

Furthermore, the second radially extending portion 212 includes a plurality of return channels 222. The plurality of return channels 222 is configured to enable a return flow of the pressurized fluid 211 towards a second region of low pressure 224 therethrough. Reference numeral 226 is representative of an entrance of each of the plurality of return channels 222 (shown in FIGS. 4 and 5).

Additionally, the aspirating face seal assembly 118 includes an annular ring 232. The annular ring 232 is concentrically disposed on the second radially extending portion 212 and between the rotor surface 206 and the second radially extending portion 212. The annular ring 232 includes one or more openings 234 formed circumferentially thereon. The annular ring 232 is disposed on the second radially extending portion 212 such that when there is no rub/contact between the annular ring 232 and the rotor surface 206, the one or more openings 234 are aligned with the entrances 226 of the return channels 222. Specifically, the one or more openings 234 are aligned with the entrances 226 of the return channels 222 (see FIG. 4) such that the return flow of the pressurized fluid 211 towards the second region of low pressure 224 occurs via the plurality of return channels 222.

Figure 4:
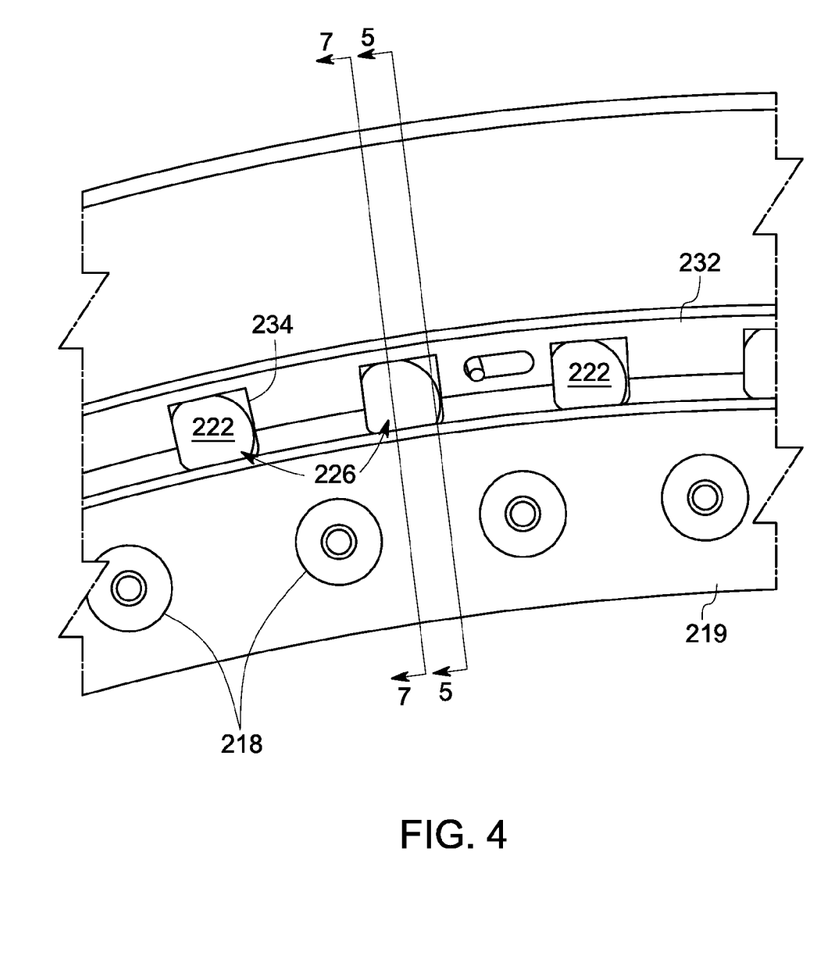
FIG. 4 is a perspective view of a portion of an aspirating face seal assembly during normal operating condition of a turbo-machine in accordance with an embodiment of the present invention.

FIG. 4 is a perspective view of a portion of the aspirating face seal assembly 118 during normal operating condition of the turbo-machine 100 (shown in FIG. 1) in accordance with an embodiment of the present invention. It should be noted herein that the term "normal operating condition" of the turbo-machine 100 (shown in FIG. 1) refers to an operating condition when there is no rub between the rotor surface 206 of the first radially extending portion 204 and the annular ring 232. As depicted in FIG. 4, the one or more openings 234 of the annular ring 232 are aligned with the entrances 226 of the return channels 222.

Figure 5:
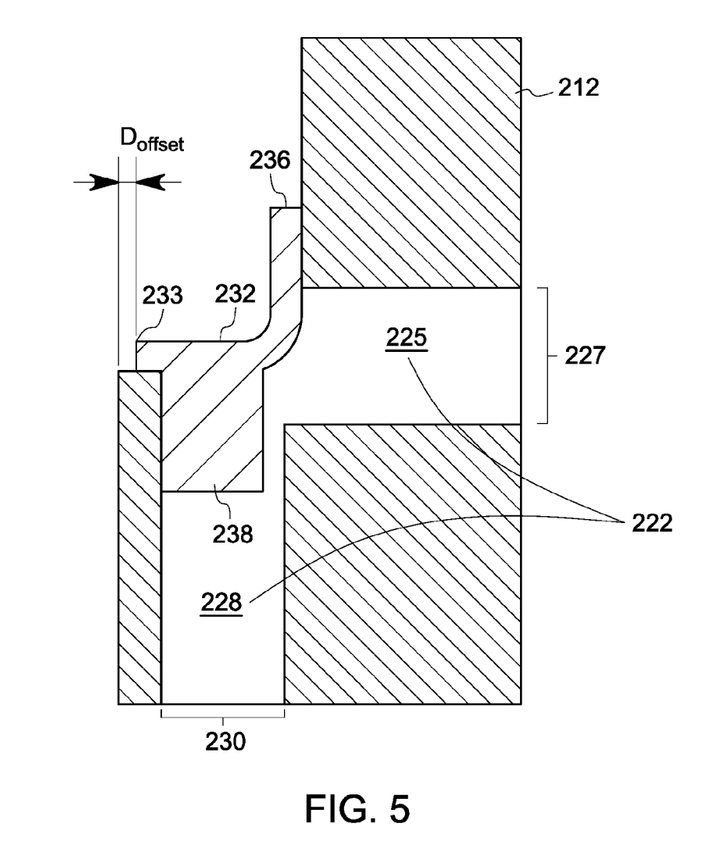
FIG. 5 is a cross-sectional view of a portion of an aspirating face seal assembly in accordance with an embodiment of the present invention.

FIG. 5 is a cross-sectional view of a portion of the aspirating face seal assembly 118 in accordance with an embodiment of the present invention. More particularly, in one embodiment, the cross-sectional view of FIG. 5 represents a cross-sectional view taken along a plane 5-5 of the perspective view represented in FIG. 4. The annular ring 232 has an L-shaped cross section. One or more of the plurality of return channels 222 is bifurcated into an axial conduit 225 having a first exit 227 and a radial conduit 228 having a second exit 230 to aid in the return flow of the pressurized fluid 211 towards the second region of low pressure 224.

As depicted in FIG. 5, the annular ring 232 may be disposed on the second radially extending portion 212 such that a first end 233 of the annular ring 232 is oriented towards the rotor surface 206 along an axial direction (i.e. the centerline 116) of the turbo-machine 100 (shown in FIG. 1) and a second end 236 of the annular ring 232 is oriented along a radial direction of the turbo-machine 100 (shown in FIG. 1).

In some embodiments, it may be desirable to allow certain amount of rub of the bearing surface 219 of the second radially extending portion 212 before the rotor surface 206 touches the annular ring 232 (i.e., before initiating the rotation of the annular ring 232). Accordingly, the annular ring 232 may be disposed on the second radially extending portion 212 such that the first end 233 of the annular ring 232 is offset from the bearing surface 219 by an offset distance "$D_{offset}$." As a result, the annular ring 232 would start rotating once some amount of material from the bearing surface 219 corresponding to the offset distance "$D_{offset}$" is removed by rubbing against the first radially extending portion 204. In a non-limiting example, the offset distance "$D_{offset}$" may be in a range of 0 to 0.020 inches. In some alternative embodiments, the annular ring 232 is disposed on the second radially extending portion 212 such that the first end 233 of the annular ring 232 is disposed aligned with the bearing surface 219.

Additionally, the annular ring 232 includes one or more third radially extending portions 238. For ease of illustration, only one such third radially extending portion 238 is shown in FIG. 5. In a non-limiting embodiment, during manufacturing, the third radially extending portion 238 is formed by folding, radially inwardly, a sheet partially cut from the annular ring 232 while forming the openings 234. The annular ring 232 is disposed on the second radially extending portion 212 such that the one or more third radially extending portions 238 are disposed in the corresponding radial conduits 228.

Figure 6:
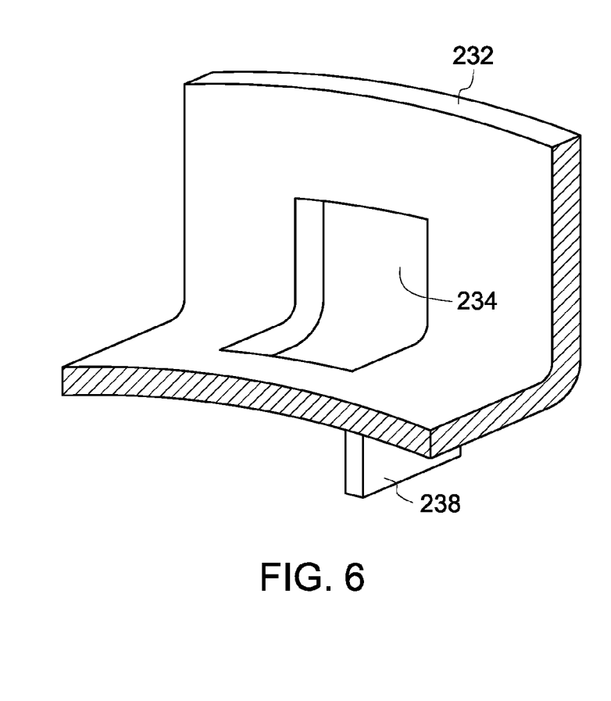
FIG. 6 is a perspective view of a portion of an annular ring in accordance with an embodiment of the present invention.

FIG. 6 is a perspective view of a portion of the annular ring 232 in accordance with an embodiment of the present invention. The third radially extending portion 238 is shown extending along a radially inwardly extending direction. As previously noted, the third radially extending portion 238 is formed by folding a sheet partially cut from the annular ring 232 while forming the openings 234.

Figure 7:
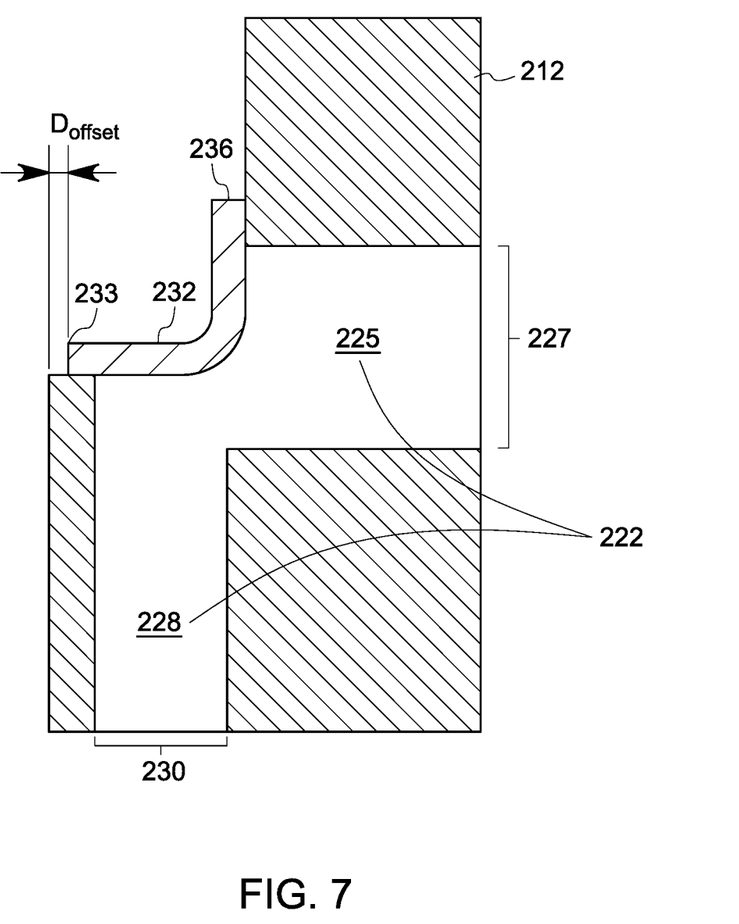
FIG. 7 is a cross-sectional view of a portion of an aspirating face seal assembly in accordance with an embodiment of the present invention.

FIG. 7 is a cross-sectional view of a portion of an aspirating face seal 118 assembly in accordance with an embodiment of the present invention. More particularly, in one embodiment, the cross-sectional view of FIG. 7 represents a cross-sectional view taken along a plane 7-7 of the perspective view represented in FIG. 4. As previously noted, the annular ring 232 is represented as having the L-shaped cross section. One or more of the plurality of return channels 222 are shown bifurcated into the axial conduit 225 having the first exit 227 and the radial conduit 228 having the second exit 230 to aid the return flow of the pressurized fluid 211 towards the second region of low pressure 224 (shown in FIG. 2).

The pressurized fluid 211 from a gap between the rotor surface 206 and the second radially extending portion 212 may enter into the return channels 222 via the respective entrance 226 and exit via the first exit 227 and the second exit 230 towards the second region of low pressure 224. As a result, the aspirating face seal assembly 118 is operated with a pressure equilibrium such that contact between the rotor surface 206 and the seal body 205 is avoided. However, under extreme circumstances, the contact between the seal body 205 and rotor surface 206 of the first radially extending portion 204 may be possible. In such circumstances, the aspirating face seal assembly 118 is configured to operate in a fail-safe mode by moving the seal body 205 away from the rotor surface 206.

During operation, the annular ring 232 is configured to rotate in an event of rub between the first radially extending portion 204 (i.e. the rotor surface 206) and the annular ring 232. When the rotor surface 206 touches the annular ring 232, due to friction therebetween, a torque is applied on the annular ring 232 in the direction of rotation of the first radially extending portion 204. The torque, in turn, causes the annular ring 232 to rotate in the direction of rotation of the first radially extending portion 204.

Figure 8:
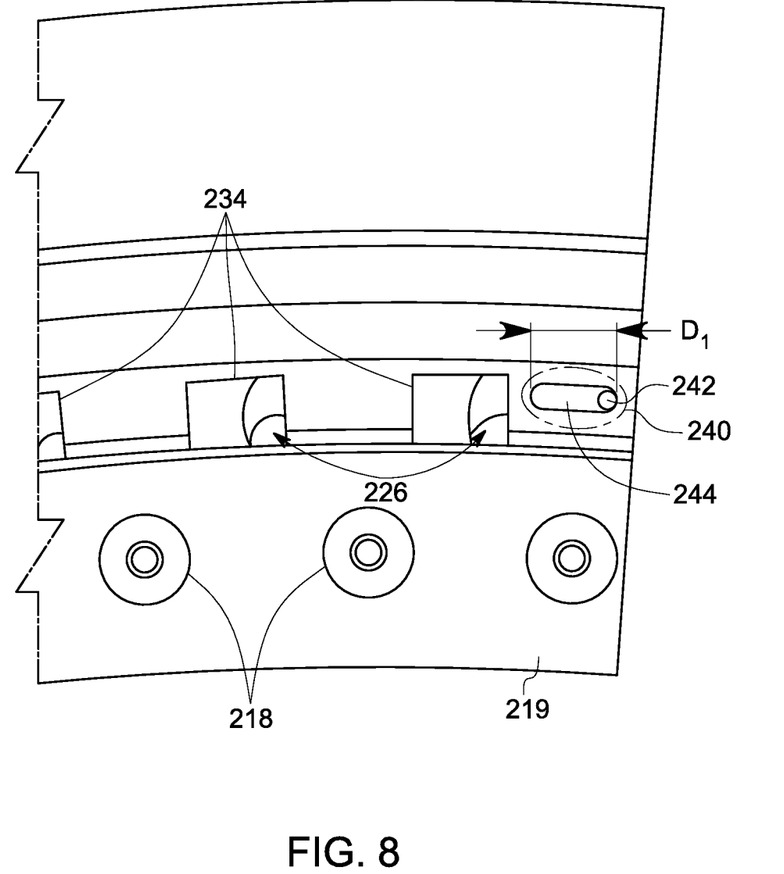
FIG. 8 is a perspective view of a portion of an aspirating face seal assembly during a rub condition in accordance with an embodiment of the present invention.

FIG. 8 is a perspective view of a portion of the aspirating face seal assembly 118 during a rub condition in accordance with an embodiment of the present invention. The rub condition of the turbo-machine 100 (FIG. 1) refers to an operating condition when there is a rub between the rotor surface 206 of the first radially extending portion 204 and the annular ring 232. The annular ring 232 partially blocks a portion of the entrance 226 of one or more of the plurality of return channels 222 to increase a force of the flow of the pressurized fluid 211 to bias the second radially extending portion 212 away from the rotor surface 206. Furthermore, the one or more third radially extending portions 238 are configured to block a portion of the one or more of the radial conduits 228. The partial blocking of one or more of the plurality of return channels 222 causes a reduction in effective area for the return flow of the pressurized fluid 211 to pass therethrough. The reduction in effective area for the return flow of the pressurized fluid 211 results in an increased pressure of the pressurized fluid 211 in a space between the second radially extending portion 212 and the first radially extending portion 204, which in turn, increases the opening force exerted on the second radially extending portion 212. Such an increase in the opening force causes the seal body 205 to axially move away from the first radially extending portion 204.

The aspirating face seal assembly 118 includes a first stopper mechanism 240 for restricting a rotational motion of the annular ring 232 up to a first predefined distance "$D_1$" from a steady state position of the annular ring 232 in the event of rub between the first radially extending portion 204 and the annular ring 232. The first stopper mechanism 240 includes a protrusion 242 formed on the second radially extending portion 212. The first stopper mechanism 240 further includes stopper opening 244 formed on the annular ring 232. The protrusion 242 is engaged to the stopper opening 244 and protrudes toward the rotor surface 206. In a non-limiting example, the first predefined distance "$D_1$" may be defined by a width of the stopper opening 244.

The third radially extending portion 238 may also function as a second stopper mechanism. The third radially extending portion 238 restricts a rotational motion of the annular ring 232 up to a second predefined distance "$D_2$" (not marked in FIG. 8) from a steady state position of the annular ring 232 in the event of rub between the first radially extending portion 204 and the annular ring 232. The second predefined distance "$D_2$" may be equal to a width or diameter of the radial conduit 228 in which the third radially extending portion 238 is disposed.

Figure 9:
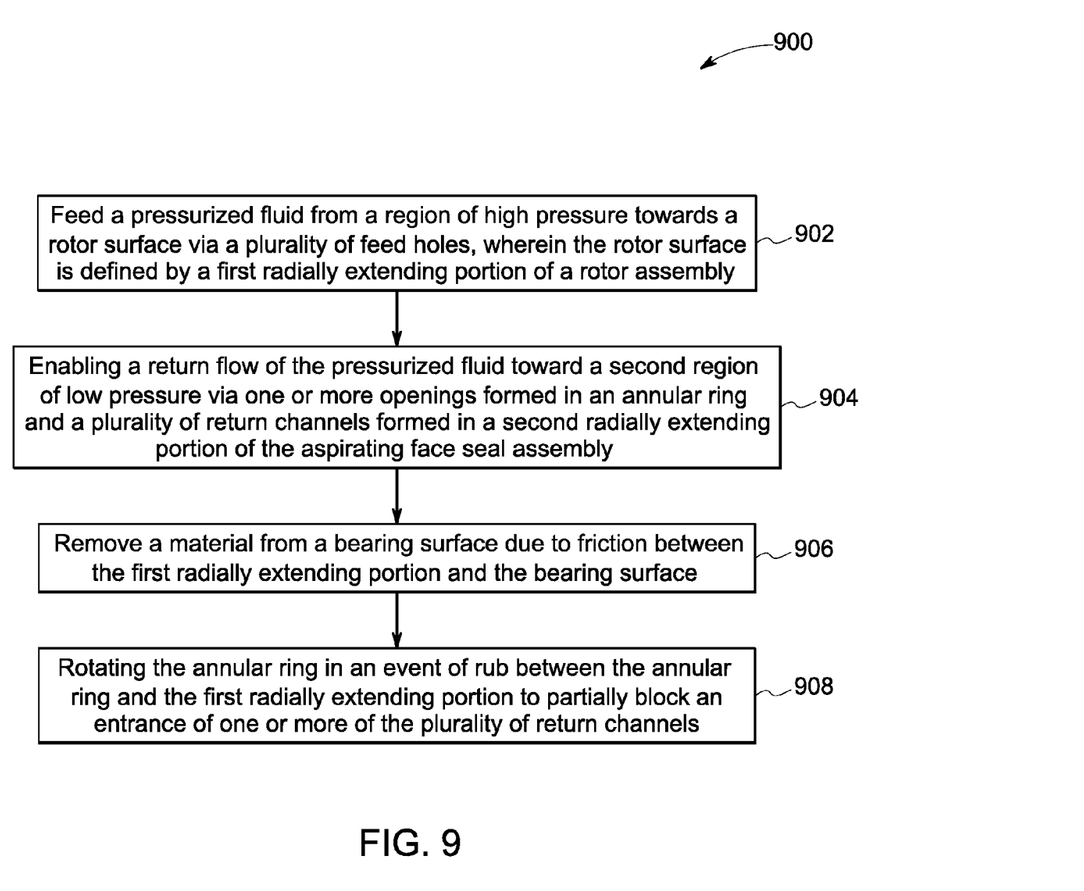
FIG. 9 is a flowchart of a method for operating an aspirating face seal assembly of a turbo-machine in accordance with an embodiment of the present invention.

FIG. 9 is a flowchart 900 of an example method for operating the aspirating face seal assembly 118 in accordance with an embodiment of the present invention. For ease of illustration the flowchart 900 is described in conjunction with FIGS. 1-8.

At step 902, the method, includes feeding a pressurized fluid 211 from the first region of high pressure 220 towards the rotor surface 206 via the plurality of feed holes 218. At step 904, the method, further includes enabling the return flow of the pressurized fluid 211 toward the second region of low pressure 224 via the one or more openings 234 formed in the annular ring 232 and the plurality of return channels 222 formed in the second radially extending portion 212 of the aspirating face seal assembly 118.

Under normal operating conditions, the aspirating face seal assembly 118 is operated to maintain a very tight clearance and functions as a non-contact seal. However, under extreme circumstances, a contact/rub between the seal body 205 and rotor surface 206 of the first radially extending portion 204 may occur. At step 906, during a rub condition between the annular ring 232 and the first radially extending portion 204, some amount of material from the bearing surface 219 is removed due to friction between the first radially extending portion 204 and the bearing surface 219. As previously noted, in some embodiments, the first end 233 of the annular ring 232 is offset from the bearing surface 219 by the offset distance "$D_{offset}$."

Once the amount of material corresponding to the offset distance "$D_{offset}$" is removed from the bearing surface 219, the first radially extending portion 204 contacts the annular ring 232. When the first radially extending portion 204 is rotated while contacting the annular ring 232, a torque is applied on the annular ring 232 along the direction of rotation of the first radially extending portion 204. Accordingly, at step 908, the annular ring 232 is rotated to partially block the entrance 226 of one or more of the plurality of return channels 222 thereby increasing a force of the flow of the pressurized fluid 211 to bias the second radially extending portion 212 away from the rotor surface 206.

In accordance with some embodiments, the aspirating face seal assembly operates in a fail-safe mode in an event of a rub between the rotor surface and the seal body. More particularly, by way of enabling a rotation of the annular ring, a portion of an entrance of one or more of the plurality of return channels may be blocked to increase a force of the flow of the pressurized fluid 211 to bias the seal body away from the rotor surface. Accordingly, reliability and robustness of the aspirating face seal assembly and the turbo-machine are improved.

The present invention has been described in terms of some specific embodiments. They are intended for illustration only, and should not be construed as being limiting in any way. Thus, it should be understood that modifications can be made thereto, which are within the scope of the invention and the appended claims. It will be appreciated that variants of the above disclosed and other features and functions, or alternatives thereof, may be combined to create many other different systems or applications. Various unanticipated alternatives, modifications, variations, or improvements therein may be subsequently made by those skilled in the art and are also intended to be encompassed by the following claims.

The invention claimed is:

1. An aspirating face seal assembly for a turbo-machine comprising a rotor assembly having a first radially extending portion defining a rotor surface, the aspirating face seal assembly comprising:

a seal body comprising a second radially extending portion defining a bearing surface and comprising one or more feed holes and a plurality of return channels, wherein the second radially extending portion is configured to be disposed in the turbo-machine such that the bearing surface is disposed facing the rotor surface, the one or more feed holes configured to enable a feed flow of a pressurized fluid toward the rotor surface; and an annular ring comprising one or more openings and concentrically disposed on the second radially extending portion, wherein the annular ring is configured to be disposed between the rotor surface and the second radially extending portion and rotate in an event of rub between the first radially extending portion and the annular ring.

2. The aspirating face seal assembly of claim 1, further comprising a stopper mechanism for restricting a rotational motion of the annular ring up to a predefined distance from a steady state position in the event of rub between the first radially extending portion and the annular ring.

3. The aspirating face seal assembly of claim 2, wherein the stopper mechanism comprises a protrusion formed on the second radially extending portion and a stopper opening formed on the annular ring, wherein the protrusion is engaged to the stopper opening and configured to protrude towards the rotor surface, and wherein the predefined distance is defined by a width of the stopper opening.

4. The aspirating face seal assembly of claim 1, wherein the second radially extending portion includes the one or more feed holes configured to enable the feed flow of the pressurized fluid from a first region toward the rotor surface.

5. The aspirating face seal assembly of claim 4, wherein the one or more openings are configured to enable a return flow of the pressurized fluid toward a second region via the plurality of return channels.

6. The aspirating face seal assembly of claim 5, wherein the annular ring, when rotated, blocks a portion of an entrance of one or more of the plurality of return channels to increase a force of the feed flow of the pressurized fluid to bias the second radially extending portion away from the rotor surface.

7. The aspirating face seal assembly of claim 5, wherein one or more of the plurality of return channels are bifurcated into an axial conduit and a radial conduit to aid in the return flow of the pressurized fluid toward the second region.

8. The aspirating face seal assembly of claim 7, wherein the annular ring further comprises one or more third radially extending portions, wherein each of the one or more third radially extending portions is disposed in the corresponding radial conduit.

9. The aspirating face seal assembly of claim 8, wherein each of the one or more third radially extending portions is configured to block a portion of the corresponding radial conduit.

10. The aspirating face seal assembly of claim 8, wherein the one or more third radially extending portions are configured to restrict a rotational motion of the annular ring up to a predefined distance from a steady state position in the event of rub between the first radially extending portion and the annular ring.

11. The aspirating face seal assembly of claim 1, wherein the annular ring comprises an L-shaped cross section having a first end and a second end.

12. The aspirating face seal assembly of claim 11, wherein the annular ring is disposed on the second radially extending portion such that the first end is configured to be oriented towards the rotor surface along an axial direction of the turbo-machine and the second end is configured to be oriented along a radial direction of the turbo-machine.

13. The aspirating face seal assembly of claim 11, wherein the annular ring is disposed on the second radially extending portion such that the first end is offset from the bearing surface by an offset distance.

14. The aspirating face seal assembly of claim 13, wherein the offset distance is in a range of 0 to 0.020 inches.

15. A turbo-machine comprising:
a stationary support;
a rotor assembly comprising a first radially extending portion defining a rotor surface; and
an aspirating face seal assembly coupled to the stationary support and disposed between the stationary support and the rotor assembly, wherein the aspirating face seal assembly comprises:
a seal body comprising a second radially extending portion defining a bearing surface and comprising one or more feed holes and a plurality of return channels, wherein the bearing surface is disposed facing the rotor surface, the one or more feed holes configured to enable a feed flow of a pressurized fluid toward the rotor surface; and
an annular ring comprising one or more openings and concentrically disposed on the second radially extending portion, wherein the annular ring is disposed between the rotor surface and the second radially extending portion and configured to rotate in an event of rub between the first radially extending portion and the annular ring.

16. The turbo-machine of claim 15, wherein of the one or more feed holes are configured to enable the feed flow of the pressurized fluid from a first region toward the rotor surface, and wherein the one or more openings are configured to enable a return flow of the pressurized fluid toward a second region via the plurality of return channels.

17. The turbo-machine of claim 16, wherein one or more of the plurality of return channels are bifurcated into an axial conduit and a radial conduit to aid in the return flow of the pressurized fluid towards the second region of low pressure.

18. The turbo-machine of claim 17, wherein the annular ring further comprises one or more third radially extending portions, wherein each of the one or more third radially extending portions is disposed in the corresponding radial conduit.

19. A method for operating an aspirating face seal assembly, the method comprising:
feeding a pressurized fluid from a region of high pressure towards a rotor surface via a plurality of feed holes, wherein the rotor surface is defined by a first radially extending portion of a rotor assembly;
enabling a return flow of the pressurized fluid towards a second region of low pressure via one or more openings formed in an annular ring and a plurality of return channels formed in a second radially extending portion of the aspirating face seal assembly, wherein the second radially extending portion defines a bearing surface disposed facing the rotor surface and wherein the annular ring is concentrically disposed on the second radially extending portion and between the rotor surface and the second radially extending portion; and
rotating the annular ring in an event of rub between the annular ring and the first radially extending portion to partially block an entrance of one or more of the plurality of return channels thereby increasing a force of the feed flow of the pressurized fluid to bias the second radially extending portion away from the rotor surface.

20. The method of claim 19, further comprising removing a material from the bearing surface due to friction between the first radially extending portion and the bearing surface prior to rotating the annular ring.

\* \* \* \* \*